US011599204B2

(12) United States Patent
Nguyen et al.

(10) Patent No.: US 11,599,204 B2
(45) Date of Patent: Mar. 7, 2023

(54) ELECTRONIC DEVICE THAT PROVIDES A LETTER INPUT USER INTERFACE (UI) AND CONTROL METHOD THEREOF

(71) Applicant: SAMSUNG ELECTRONICS CO., LTD., Suwon-si (KR)

(72) Inventors: Xuan Toi Nguyen, Bac Giang (VN); Chang-wan Huh, Yongin-s (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 215 days.

(21) Appl. No.: 16/763,836

(22) PCT Filed: Oct. 12, 2018

(86) PCT No.: PCT/KR2018/012053
§ 371 (c)(1),
(2) Date: May 13, 2020

(87) PCT Pub. No.: WO2019/098534
PCT Pub. Date: May 23, 2019

(65) Prior Publication Data
US 2021/0405766 A1    Dec. 30, 2021

(30) Foreign Application Priority Data

Nov. 15, 2017 (KR) .................. 10-2017-0152283

(51) Int. Cl.
*G06F 3/023* (2006.01)
*G06F 9/451* (2018.01)
(Continued)

(52) U.S. Cl.
CPC .......... *G06F 3/0237* (2013.01); *G06F 3/0236* (2013.01); *G06F 3/0484* (2013.01); *G06F 3/04886* (2013.01); *G06F 9/454* (2018.02)

(58) Field of Classification Search
CPC .. G06F 3/04886; G06F 3/0237; G06F 3/0233; G06F 3/0236; G06F 3/0484; G06F 9/454
See application file for complete search history.

(56) References Cited

U.S. PATENT DOCUMENTS 6,573,844 B1    6/2003  Venolia et al.
8,490,008 B2    7/2013  Griffin et al.
(Continued)

FOREIGN PATENT DOCUMENTS

KR    10-2010-0012844 A    2/2010
KR    10-2012-0009200 A    2/2012
(Continued)

OTHER PUBLICATIONS

International Search Report dated Jan. 21, 2019 issued by the International Searching Authority in counterpart International Application No. PCT/KR2018/012053 (PCT/ISA/210).
(Continued)

*Primary Examiner* — Tan H Tran
(74) *Attorney, Agent, or Firm* — Sughrue Mion, PLLC

(57) ABSTRACT

An electronic device is disclosed. The electronic device includes a display, a storage unit configured to store a combination rule of letters constituting a word; and a processor configured to provide a letter input UI of a specific language, to predict a first letter inputted on the letter input UI and a second letter to be selected based on the letter combination rule of the specific language stored in the storage unit, and to control the display such that an active area of a key corresponding to the second letter is expansively provided.

11 Claims, 13 Drawing Sheets

(51) Int. Cl.
  *G06F 3/0484* (2022.01)
  *G06F 3/04886* (2022.01)

(56) References Cited

U.S. PATENT DOCUMENTS

| | | | |
|---|---|---|---|
| 8,610,669 B2 | 12/2013 | Huh | |
| 8,786,551 B2 | 7/2014 | Perry | |
| 9,046,928 B2 | 6/2015 | Kumhyr | |
| 9,152,323 B2 | 10/2015 | Griffin et al. | |
| 9,489,128 B1 | 11/2016 | Zhang | |
| 2009/0174667 A1 | 7/2009 | Kocienda et al. | |
| 2010/0026650 A1 | 2/2010 | Srivastava et al. | |
| 2011/0078613 A1* | 3/2011 | Bangalore | G06F 3/0426 715/773 |
| 2012/0023433 A1 | 1/2012 | Choi et al. | |
| 2014/0098069 A1* | 4/2014 | Tseng | G06F 3/0238 345/178 |
| 2014/0240237 A1* | 8/2014 | Park | G06F 3/0237 345/168 |
| 2017/0052702 A1* | 2/2017 | Norris, III | G06F 40/274 |
| 2017/0060413 A1* | 3/2017 | Singh | G06F 3/0233 |

FOREIGN PATENT DOCUMENTS

| | | |
|---|---|---|
| KR | 10-1553395 B1 | 9/2015 |
| WO | 2017/131251 A1 | 8/2017 |

OTHER PUBLICATIONS

Written Opinion dated Jan. 21, 2019 issued by the International Searching Authority in counterpart International Application No. PCT/KR2018/012053 (PCT/ISA/237).

Communication dated Nov. 9, 2021 by the Korean Patent Office for Korean Patent Application No. 10-2017-0152283.

* cited by examiner

ELECTRONIC DEVICE THAT PROVIDES A LETTER INPUT USER INTERFACE (UI) AND CONTROL METHOD THEREOF

TECHNICAL FIELD

The present disclosure relates generally to an electronic device and a control method thereof, and more particularly, to an electronic device configured to provide a letter input UI and a control method thereof.

BACKGROUND ART

Modern electronic devices do not unilaterally provide a function or information to a user, but provide various functions or information in response to a user command. For example, recently released electronic devices such as TVs, smartphones, and the like provide user interaction functions such as application execution functions, web browsing search functions, letter transmission and reception functions, SNS functions, and the like. Therefore, the electronic devices provide a user with a letter input UI (e.g., a virtual keyboard) to receive a user command.

However, the letter input UI includes a large number of letters, which requires a lot of attention for the user to select a specific letter.

DETAILED DESCRIPTION OF THE INVENTION

Technical Problem

The present application is to provide an electronic device configured to predict a letter key to be input on a letter input UI to be distinguished from other letter keys, and a control method thereof.

Technical Solution

An electronic device according to an embodiment of the disclosure includes a display, a storage unit for storing a combination rule of letters constituting a word, and a processor for providing a letter input UI of a specific language, predicting a first letter inputted on the letter input UI and a second letter to be selected based on the letter combination rule of the specific language stored in the storage unit, and controlling the display such that an active area of a key corresponding to the second letter is expansively provided.

The processor may be configured to provide the active area expanded to a peripheral perimeter area of the key corresponding to the second letter.

The processor may be configured to collect touch points on the letter input UI based on a user's input history, and to expand the active area of the key corresponding to the second letter based on the collected touch points.

The processor may be configured to identify an area covering the collected touch points, to expand the identified area based on a center point of the identified area and determine the active area of the key corresponding to the second letter, and to control the display in order to display the expanded active area.

The processor may be configured to display the expanded active area in a color different from colors of the remaining keys.

The letter combination rule may be configured to be acquired for each language by analyzing a role of letters used together with a specific letter from letters comprising specific letters.

The processor may be configured to acquire the letter combination rule corresponding to the language in at least one case of when the letter input UI is loaded and when the language is selected by the user.

The processor may be configured, based on the first letter and the letter combination rule of the specific language, to predict a second letter having a first priority and a third letter having a second priority, and to expansively provide active areas of the keys corresponding to the second letter and the third letter.

The processor may be configured to display the active areas of the keys corresponding to the second letter and the third letter in a color different from the remaining keys.

The processor may be configured to display the active areas of the keys corresponding to the second letter and the third letter such that at least one of color and lightness is different.

A control method of an electronic device configured to store a combination rule of letters constituting a word, the method includes providing a letter input UI of a specific language, and predicting a first letter inputted on the letter input UI and a second letter to be selected based on the letter combination rule of the specific language, and expansively providing an active area of a key corresponding to the second letter on the letter input UI.

The expansively providing the active area may include providing, the active area expanded to a peripheral perimeter area of the key corresponding to the second letter.

The method further may include collecting touch points on the letter input UI based on a user's input history, wherein the expansively providing the active area is configured to expand the active area of the key corresponding to the second letter based on the collected touch points.

The expansively providing the active area may include identifying an area that covers the collected touch points, expanding the identified area based on a center point of the identified area and determining the active area of the key corresponding to the second letter, and displaying the expanded active area.

The expansively providing the active area may include displaying the active area in a color different from colors of the remaining keys.

The letter combination rule may be configured to be acquired for each language by analyzing a role of letters used together with a specific letter from letters comprising specific letters.

The method further may include acquiring the letter combination rule corresponding to the language in at least one case of when the letter input UI is loaded and when the language is selected by the user.

The expansively providing the active area may include, based on the first letter and the letter combination rule of the specific language, predicting a second letter having a first priority and a third letter having a second priority, and expansively providing active areas of the keys corresponding to the second letter and the third letter.

The expansively providing the active area may include displaying the active areas of the keys corresponding to the second letter and the third letter in a color different from the remaining keys.

A computer program product according to an embodiment includes a recording medium storing a program which is configured to perform an operation of providing a letter input UI of a specific language, and an operation of predicting a first letter inputted on the letter input UI and a second letter to be selected based on of a letter combination rule of the specific language, and expansively providing an active area of a key corresponding to the second letter on the letter input UI.

Effect of the Invention

According to the various embodiments of the disclosure, a letter key to be inputted next is predicted on the letter input UI and provided to be distinguished from other letter keys, thereby improving a user's convenience.

BEST MODE FOR IMPLEMENTING THE DISCLOSURE

[Mode for Implementing the Disclosure]

Figure 1:
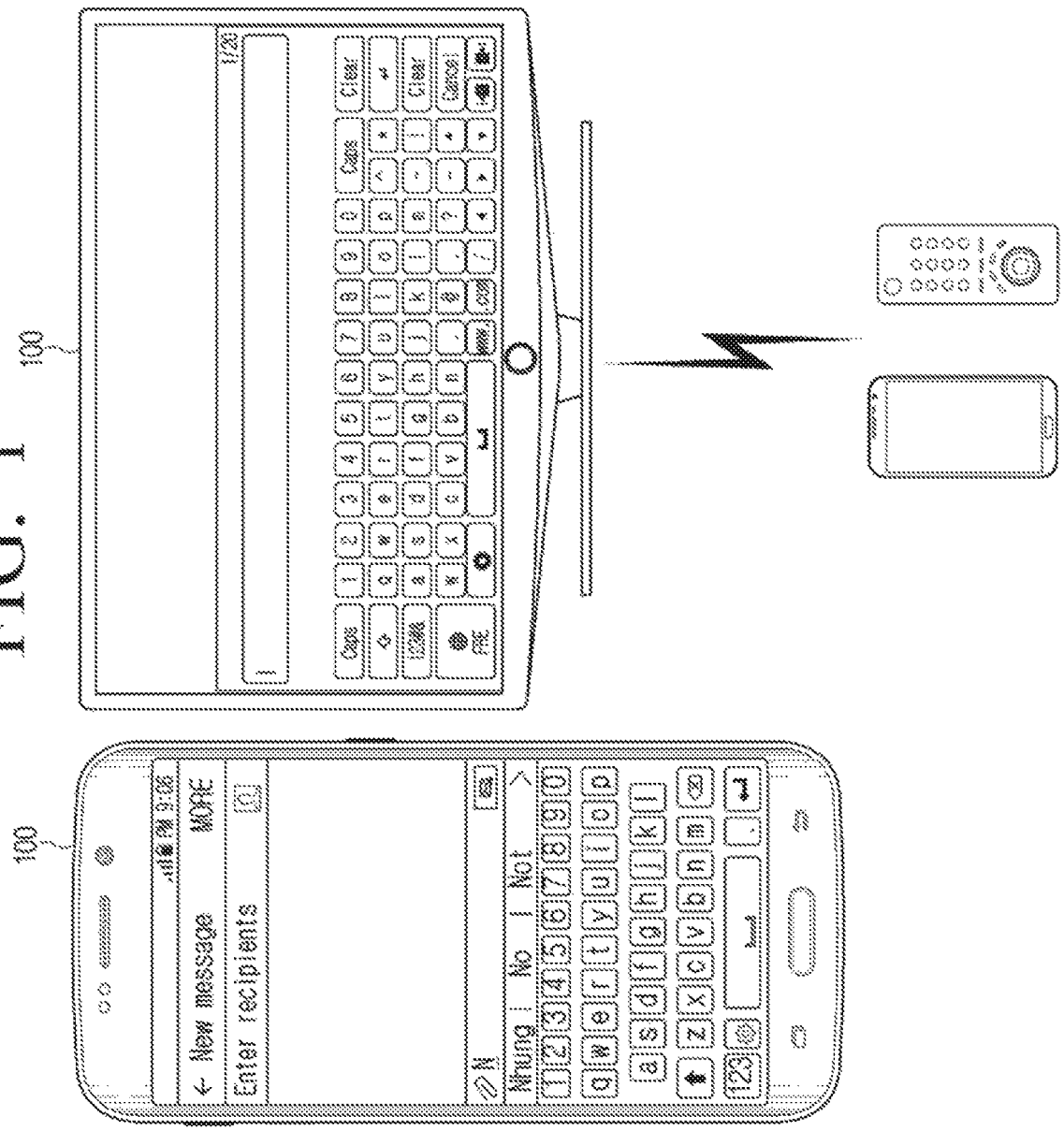
FIG. 1 is a diagram illustrating an example of implementing a display device according to an embodiment.

Hereinafter, the disclosure will now be explained in detail with reference to the accompanying drawings.

The terms used in example embodiments will be briefly explained, and example embodiments will be described in greater detail with reference to the accompanying drawings.

Terms used in the present disclosure are selected as general terminologies currently widely used in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The example embodiments may vary, and may be provided in different example embodiments. Various example embodiments will be described with reference to accompanying drawings. However, this is not intended to limit the scope to an exemplary embodiment, and therefore, it should be understood that all the modifications, equivalents or substitutes included under the invented spirit and technical scope are encompassed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the present disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

FIG. 1 is a diagram illustrating an example of implementing a display device according to an embodiment.

According to FIG. 1, the electronic device 100 may be implemented as various types of devices that receive a user command through a virtual keyboard by providing a virtual command. For example, the electronic device 100 may be implemented in various devices such as a tablet personal computer (PC), a digital TV, a desktop personal computer (PC), a laptop personal computer (PC), a netbook computer, a personal digital assistant (PDA), a portable multimedia player (PMP), MP3 players, mobile medical devices, cameras, camcorders, electronic photo frames or wearable devices (e.g., head-mounted-device (HMD)), a smart watch, or the like. According to an embodiment, when the display device 100 implemented to be a mobile device, it may include a touch screen therein so that programs are executed with a finger or a pen (e.g., stylus pen). According to another embodiment, the electronic device 100 may be implemented to receive a command for selecting a key on a virtual keyboard from a remote controller, a mobile phone having a remote controller function, and the like.

The electronic device 100 may provide various user interface (UI) screens according to a received user command. In addition, the electronic device 100 may provide various functions and information according to various types of user interaction with respect to a UI screen.

For example, the electronic device 100 may provide a letter input UI (or an UI to input a letter) as illustrated according to various events.

In that case, the electronic device 100 may predict (or identify) a letter to be input on the letter input UI according to a predefined letter combination rule, and display it in a distinctive manner. Hereinafter, various embodiments of the disclosure will be described with reference to a block diagram illustrating a specific configuration of the electronic device 100.

Figure 2:
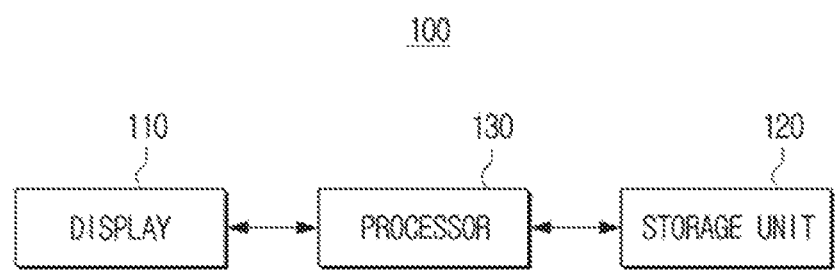
FIG. 2 is a block diagram illustrating a configuration of an electronic device according to an embodiment of the disclosure.

FIG. 2 is a block diagram illustrating a configuration of an electronic device according to an embodiment of the disclosure.

Referring to FIG. 2, the electronic device IOU includes a display 110, a storage unit 120, and a processor 130.

The display 110 displays a UI screen. For example, the UI screen may include an application execution screen including various play screens, such as an image, a video, a text, and music, and various contents, a web browser screen, a graphical user interface (GUI), and so on.

The display 110 may be implemented with various types of displays such as a liquid crystal display (LCD), an organic light emitting diode (OLED), a light-emitting diode (LED), a liquid crystal on silicon (LCoS), a digital light processing (DLP), a quantum dot (QD) display panel, or the like.

The storage unit 120 may store various data necessary for operating the electronic device 100.

For example, the storage unit 120 stores data necessary for the processor 130 to execute various processes. For example, the storage unit may be implemented as an internal memory such as a ROM, a RAM, or the like, or may be implemented as a memory separate from the processor 130. In this case, the storage unit 120 may be implemented in the form of a memory embedded in the electronic device 100 according to a purpose of a data storage, or may be implemented in the form of a memory detachable to the electronic device 100. For example, data for executing the electronic device 100 may be stored in a memory embedded in the electronic device 100, and data for expanding function of the electronic device 100 may be stored in is detachable memory to the electronic device 100. Meanwhile, a memory embedded in the electronic device 100 may be implemented in the form of a nonvolatile memory, a volatile memory, a flash memory, a hard disk drive (HDD), a solid state drive (SSD), or the like, and may be implemented in the form of a memory card (e.g., micro SD card, USB memory, etc.), an external memory (e.g., USB memory) connectable to a USB port, or the like.

The storage unit 120 may store a letter combination rule for each language. The letter combination rule means a rule in which letters constituting words for each language are combined. According to an embodiment, the letter combination rule may be acquired by analyzing a role of a letter used together with a specific letter in words including a specific letter for each language.

Most of languages have rules for combining letters to form words. In case of Vietnamese, for example, a letter "p" may only be the first or last letter in a word, and if the letter "p" is the first letter, then the next letter may only be "h". Also, the next letter of the "ph" letter may be only "a, e, o, u, i". In addition, when analyzing various Vietnamese words, the "h" may serve as pre_consonant_1, preconsonant_2, and post_consonant_2, and "a, o, i" come after the "h". Accordingly, as shown in the following table, information on a letter following a specific letter or a role of each letter may be acquired and stored.

TABLE 1

|   | a | o | i | e |
|---|---|---|---|---|
| h | pre_consonant_1 preconsonant_2 | pre_consonant_1 | pre_consonant_1 | Non |

The number of letter combination rules for each language stored in the storage unit 120 may be different by language.

Meanwhile, the letter combination rule stored in the storage unit 120 may be updated based on the user's letter input history.

The storage unit 120 may store various data, programs or applications which are used to drive and control the electronic device 100. The storage unit 120 may store a control program for controlling the electronic device 100 and the processor 130, an application initially provided by a manufacturer or downloaded from an external source, databases, or related data.

The processor 130 may control the overall operation of the electronic device 100.

According to an embodiment, the processor 130 may include one or more among a digital signal processor (DSP), a microprocessor, a time controller (TCON), a central processing unit (CPU), and a micro controller unit (MCU), micro processing unit (MPU), a controller, an application processor (AP), a communication processor (CP), an ARM processor, or may be defined as the corresponding term. In addition, the processor 130 may be implemented as a system on chip (SoC), a large scale integration (LSI) in which a processing algorithm is embedded, or a field programmable gate array (FPGA).

The processor 130 may provide a text input UI when a predetermined event for letter input is generated in the electronic device 100. The predetermined event may be a case that a user command for searching or inputting information is input. Meanwhile, the letter input UI may be a UI including a plurality of letter items and a plurality of function items (e.g, enter, space, etc.) and may be implemented as a virtual keyboard. In addition, the letter in the present application may be letters of various language such as Korean, English, Japanese (Hiragana, Katakana), Chinese, Roman, Greek, Vietnamese, and the like. However, it may further include various characters that may be input and used in the device, such as symbol characters such as numbers or various symbols, graphics characters, unit characters representing various units, special characters, and the like.

According to an embodiment of the disclosure, the processor 130 provides a letter input UI of a specific language. The specific language may be determined according to a predetermined event. For example, a specific language may be determined by a language selected by a user, a language predetermined in a currently provided screen, and the like. For example, if an English web page is displayed, the specific language may be automatically set as English.

Ina addition, the processor 130 may predict a second letter to be subsequently selected based on the letter combination rule of the corresponding language stored in the storage unit 120, and provide a key area corresponding to the second letter to be distinguished from the other key areas. According to an embodiment, the processor 130 may expand and provide an active area of a key corresponding to the second letter. Here, the active area of the key refers to an area that can receive a user command for selecting the key. For example, it may be an area capable of receiving a touch input valid for selecting the corresponding key.

According to an embodiment, the processor 130 may provide an active area expanded to at least some boundary areas of a key corresponding to the second letter. For example, when a shape of the key is rectangular, the processor may provide an active area expanded by a predetermined width among at least one of tour corners. For example, the processor 130 may provide an active area expanded by the predetermined width to a peripheral perimeter area of a key corresponding to the second letter. The predetermined width may be determined based on a size of the key area, or may be determined by a pre-stored value, a value set by a user, or the like. For example, when the shape of the key is rectangular, the processor may provide an active area expanded by the same width at each of four corners. As another example, the processor may provide an active area expanded at the left and right corners to be smaller than an active area expanded at the upper and lower corners.

According to another embodiment, the processor 130 may collect touch points on the letter input UI based on the user's input history, and determine the expanded size of the active area based on the collected touch points.

For example, when the touch points of the user are collected, the processor 130 may distinguish an area that covers the touch points for each key. For example, the processor 130 may acquire a center point of the distinguished area for each key, acquire an extended area based on the center point, and determine an expanded active area for each key based on the acquired expanded area. In this case, the acquired expanded area may be a predetermined polygonal shape, but is not limited thereto.

However, when the electronic device 100 is implemented in the form of providing a letter input UI and receiving a key on the letter input UI by an external pointing device as illustrated in another embodiment of FIG. 1, the processor may collect pointing location by a pointing device and determine an expansion size of the active area based on the collected pointing location.

According to an embodiment, the expanded active area of the key corresponding to the second letter may be provided to at least partially overlap another key area.

According to another embodiment, the expanded active area of the key corresponding to the second letter may be expanded in an area not overlapping another key area.

According to an embodiment, the processor 130 may provide an active area in which the key area itself corresponding to the second letter is expanded, for example, an active area of the same color as the key area. However, according to another embodiment, the processor may also able to maintain an original area of the key corresponding to the second letter and to provide the expanded area to be identified.

According to an embodiment, the processor 130 may display the active area of the key corresponding to the second letter in the same color as the color of the remaining keys.

According to another embodiment, the processor 130 may display the active area of the key corresponding to the second letter in a color different from colors of the remaining keys. In this case, the original key area and the expanded active area may be provided to have the same color, that is, the same color and the same lightness. Alternately, it may also possible to provide the colors of the original key area and the expanded active area to be the same, but the lightness to be different. For example, the expanded active area may be provided with a relatively higher lightness, that is relatively brighter, compared to the original key area.

In addition, the processor 130 may predict a second letter having a first priority and a third letter having a second priority, and provide by expanding an active area of keys corresponding to the second letter and the third letter based on the first letter selected on the letter input UI and the letter combination rule selected on the character input UI.

The priority may be set based on the number of letter combination rules corresponding to the corresponding letter, the user's selection history, and the like. For example, the number of letter combination rules may be firstly considered, and the user's selection history may be considered as a lower priority. For example, if there are three letter combination rules in which the second letter is combined after the first letter, and two letter combination rules in which the third letter is combined after the first letter, the second letter may have higher priority than the third letter. Also, when the number of letter combination rules in which the second letter is combined after the first letter and the number of letter combination rules in which the third letter is combined after the first letter are equal, when the number of times of inputting the second letter after the first letter more than the third letter, and if a user enters the second letter more than the third letter after the first letter, the second letter may have higher priority than the third letter. However, it is not limited thereto, and which of the letter combination rule and the user's history are considered first may vary depending on the user's selection, settings when manufacturing, and the like.

The processor 130 may display the active area of the key corresponding to the second letter of the first priority and the third letter of the second priority in a color different from the remaining keys.

In addition, the processor 130 may display the active areas of the keys corresponding to the second letter and the third letter to be distinguished from each other.

For example, the processor 130 may display an active area of keys corresponding to the second letter and the third letter so that at least one of color and lightness is different. For example, the processor 130 may display the active areas of the keys corresponding to the second letter and the third letter in different colors, respectively, or may have the same color but different brightness.

As another example, the processor 130 may highlight an edge of the active area of the key corresponding to the second letter so as to be distinguished from the active area of the key corresponding to the third letter.

According to an embodiment, while there is a user input on the letter input UI, that is, while the user is typing, the processor 130 may not expand and provide an active area of the key. For example, the processor 130 may expand the active area of the key corresponding to a predicted letter when the user's typing is completed, that is, after a touch on the previous letter is completed on the letter input UI, and may not expansively provide the active area of the key while the user keeps touching.

Meanwhile, the processor 130 may acquire a letter combination rule corresponding to a specific language in at least one case of when the letter input UI is loaded and when the specific language is selected.

For example, when the text input UI is loaded as the user touches a letter input window, the processor 130 may acquire the letter combination rule corresponding to the language set on a currently displayed screen. For another example, when a specific language is selected according to a user command on the letter input UI, the processor 130 may acquire the letter combination rule corresponding to the selected language.

When a key is not selected even after a predetermined time has passed ever since the key area has been expanded or when a specific key is selected/input based on the expanded key area, the processor 130 may return the expanded key area to its original state. For example, when the specific key is selected/input based on the expanded key area, the processor 130 may return the expanded key areas to their original state, predict a letter to be input after the inputted specific key, expand and provide a key area corresponding to the predicted letter.

In addition, the processor 130 may return the expanded key area to its original state if a key is not selected even after the predetermined time has passed after the key area is expanded.

Figure 3:
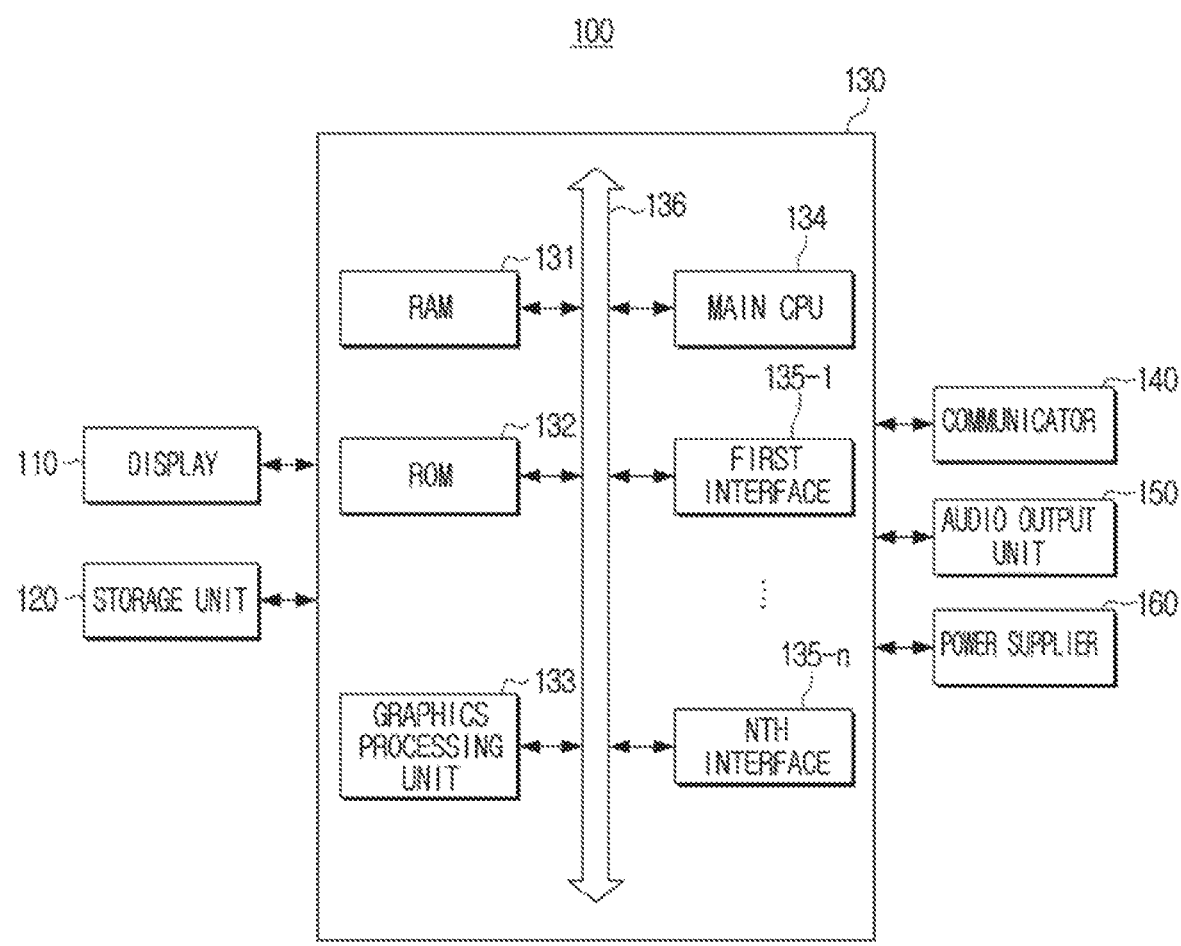
FIG. 3 is a block diagram illustrating a specific configuration of an electronic device illustrated in FIG. 2.

FIG. 3 is a block, diagram illustrating a specific configuration of an electronic device illustrated in FIG. 2.

According to FIG. 3, a display device 100' includes a display 110, a storage unit 120, a processor 130, a communicator 140, an audio output unit 150, and a power supplier 160. Among the elements illustrated in FIG. 3, detailed descriptions of elements overlapping with those illustrated in FIG. 2 will be omitted.

As illustrated in FIG. 3, the processor 130 includes a RAM 131, a ROM 132, a graphics processing unit 133, a main CPU 134, first to nth interfaces 135-1 to 135-n, and bus 136. The RAM 131, the ROM 132, the graphics processing unit 133, the main CPU 134, the first to nth interfaces 135-1 to 135-n, and the like may be coupled to each other through the bus 136.

The CPU 131 accesses the storage unit 120 and performs hooting using an O/S stored in the storage unit 120. The CPU 131 performs various operations using various programs, contents, data, etc. stored in the storage unit 120.

The ROM (ROM or non-volatile memory) 132 may store a control program for controlling the electronic device 100, and the RAM (RAM or volatile memory) 131 may be used as a storage area corresponding to various operations performed by the electronic device 100.

The ROM 132 may store a set of commands for system hooting. When a command to turn on the electronic device 100 is input and a power is provided, the main CPU 134 may copy an operating system (O/S) stored in a storage unit 120, into the RAM 131, according to a command stored in the ROM 132, and execute the O/S so that a system is booted. If the hooting is completed, the main CPU 134 may copy various application programs stored in the storage unit 120, into the RAM 131, and execute the application programs copied into the RAM 131 so that various operations are performed, according to an embodiment.

The graphics processing unit 133 may generate a screen that includes various graphical objects, such as icons, images, text, etc. using an arithmetic operator (not illustrated) and a renderer (not illustrated). The arithmetic operator calculates attribute values such as coordinates, shape, size, and color of each object to be displayed according to the layout of the screen using a control command. The rendering unit may generate various layouts of screens including objects based on the attribute value calculated in the arithmetic operator. The screen generated by the rendering unit is displayed in a display area of the display 110.

The main CPU 134 accesses to the storage unit 120, and performs booting using an O/S stored in the storage unit 120. The main CPU 134 performs various operations using various programs, contents, data and the like stored in the storage unit 120.

The first to the nth interfaces (135-1 to 135-n) are connected to the above-described various elements. One of the interfaces may be network interface which is connected to an external apparatus via a network.

Further, the processor 130 may control the electrical power provided to the elements 110 to 150 from the power supplier 160. In addition, the processor 130 may execute an operating system (OS) stored in the storage unit 120 and various applications when a predetermined event occurs. The processor 130 may include a single core, dual core, triple core, quad core, and multiple cores thereof.

The communicator 140 performs communication with an external device.

The communicator 140 may be implemented as various interfaces according to an implementation example of the electronic device 100. For example, the communication interface 110 may be implemented in a form that supports at least one communication method among various types of digital interfaces, AP-based Wi-Fi (Wi-Fi, wireless LAN network), Bluetooth, Zigbee, wired/wireless local area network (LAN), WAN, Ethernet, IEEE 1394, HDM1, USB, MHL, AES/EBU, Optical, Coaxial or the like.

In addition, the electronic device 100 may further include a separate communication interface (not illustrated) capable of receiving an image signal in streaming or download methods from an external device (e.g., a source device), an external storage medium (e.g., a USB), an external server (e.g., a web hard), or the like.

The audio output unit 150 outputs the audio signal processed by the processor 130.

For example, the audio output unit 150 may convert a digital signal processed by the processor 130 into an analog signal, amplify and output the analog signal. For example, the audio output unit 150 may include at least one speaker unit, a D/A converter, an audio amplifier, etc. capable of outputting at least one channel. For example, the audio output unit 150 may include an L channel speaker and an R channel speaker, playing an L channel and an R channel, respectively, but it is not limited thereto. The audio output unit 150 may be implemented in various forms. As another example, the audio output unit 150 may be implemented in the form of a sound bar playing the L channel, the R channel, and a center channel.

The power supplier 160 may supply power input from the external power source to internal elements 110 to 150 of the electronic device 100 under control of the processor 130. The power supplier 160 may include a battery, and the battery may be a built-in battery configured to be rechargeable, and may be detachably coupled to a body to a main body for charging. The battery may be configured to receive power through a power cable. In addition, the battery may be configured to be wirelessly charged through a wireless charging device.

According to an embodiment, the storage unit 120 may store a program for providing the letter input UI. For example, the storage unit 130 may store an application for providing the corresponding UI, that is, an application program. The application is a program capable of being provided through a predetermined software platform (or operating system) supported by the electronic device 100, and may process data such as a text, a picture, a video, or the like according to a feature of work in which the corresponding program is designed. The application may be implemented to intemperate with other applications as needed.

Figure 4A:
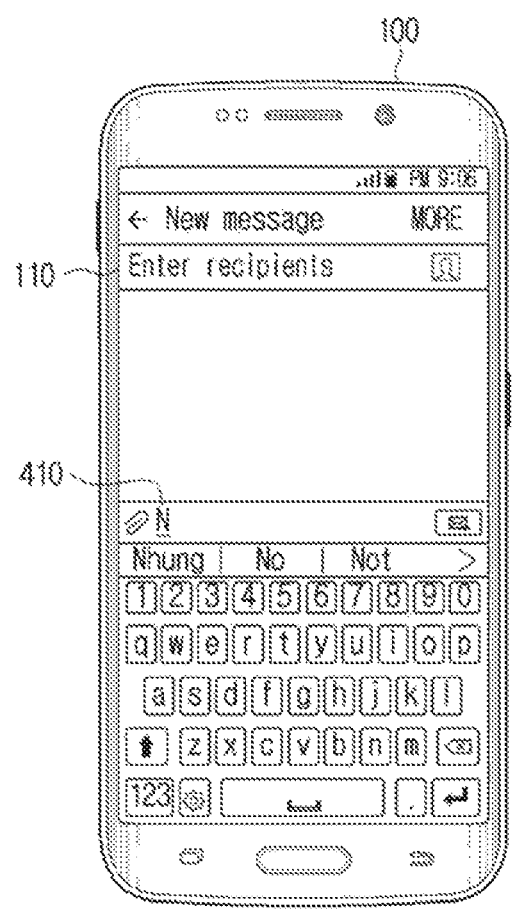
FIGS. 4A, 4B, 5A, and 5B are diagrams illustrating a method of providing a letter input UI according to an embodiment of the disclosure.
Figure 4B:
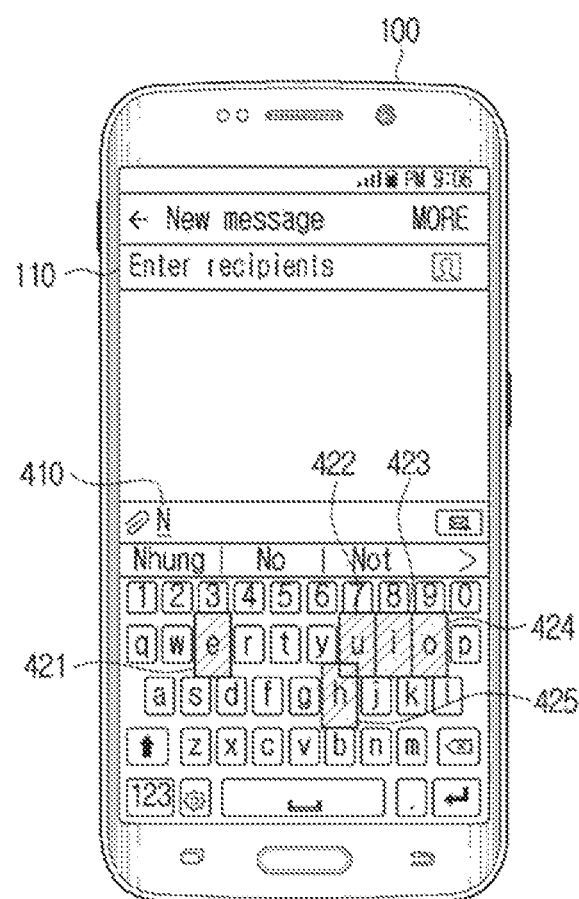

FIGS. 4A and 4B are diagrams illustrating a method of providing a letter input UI according to an embodiment of the disclosure.

A specific letter, for example, "N" 410 is input from the letter input UI 400 provided according to the predetermined event as illustrated in FIG. 4A.

In this case, the processor 130 may predict at least one letter to be input later based on the letter combination rule of corresponding language, for example, English, and expand and provide active areas of keys corresponding to the predicted letter as illustrated in FIG. 4B. For example, the processor may display the expanded active areas of the keys 421, 422, 432, 424, and 425 corresponding to the predicted letters, in different colors, which are distinguishable from other keys. However, in some cases, it may also be possible to expand only the size of the active areas of the keys 421, 422, 432, 424, and 425 corresponding to the predicted letters, and display the same color as other keys.

Figure 5A:
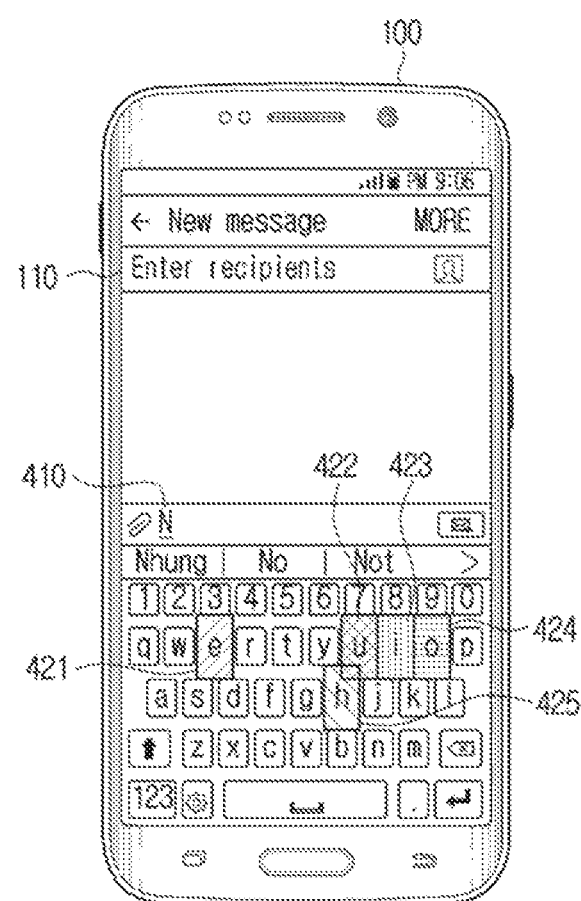
Figure 5B:
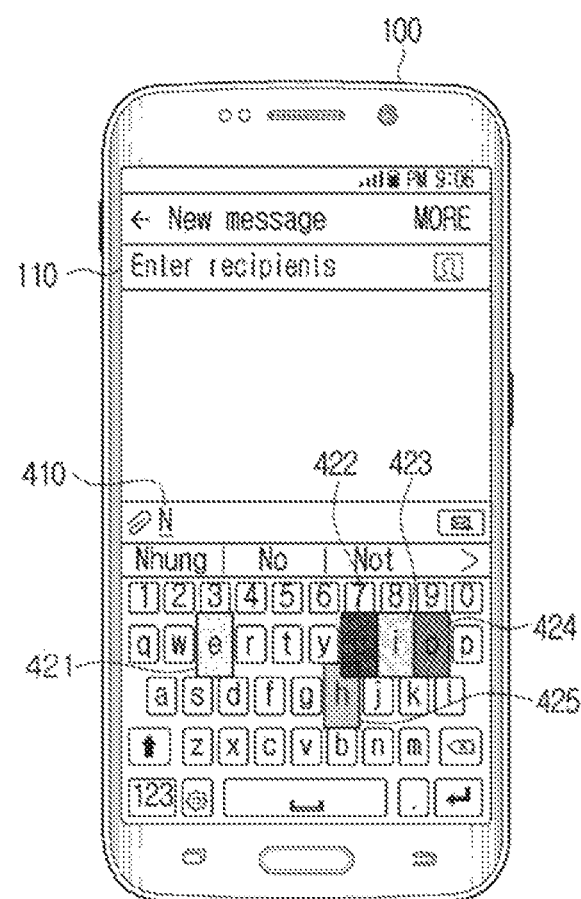

FIGS. 5A and 5B are diagrams illustrating a method of providing a letter input UI according to an embodiment of the disclosure.

A specific letter, for example, "N" 410 is input from the letter input UI 400 provided according to the predetermined event as illustrated in FIG. 4A.

In this case, the processor 130 may predict at least one letter to be input later based on the letter combination rule of corresponding language, for example, English, and expand and provide active areas of keys corresponding to the predicted letter as illustrated in FIG. 4B. For example, the processor may display the expanded active areas of the keys 421, 422, 432, 424, and 425 corresponding to the predicted letters, in different colors, which are distinguishable from other keys. However, in some cases, it may also display in different colors, and the color of each key may be determined based on priority, color set by a user, and the like.

According to another embodiment, as illustrated in FIG. 5B, the processor may display the expanded active area of the keys 421, 422, 432, 424, and 425 corresponding to the predicted letters in different colors from the other keys, and may display only the contrast in the same color.

FIGS. 6A to 6D, and 7 are diagrams illustrating a method of providing a letter input UI according to another embodiment of the disclosure.

According to another embodiment of the disclosure, the processor 130 may collect touch points on the letter input UI based on the user's input history, and determine the expanded size of the active area based on the collected touch points.

Figure 6A:
FIGS. 6A to 6D, and 7 are diagrams illustrating a method of providing a letter input UI according to another embodiment of the disclosure.
Figure 6B:
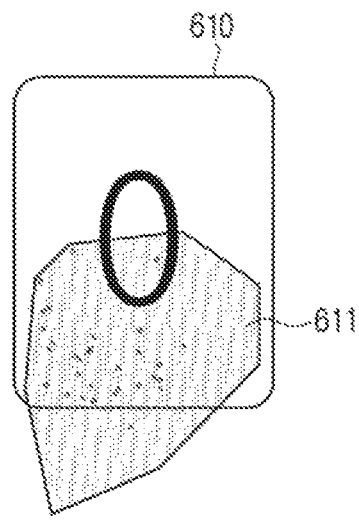
Figure 6C:
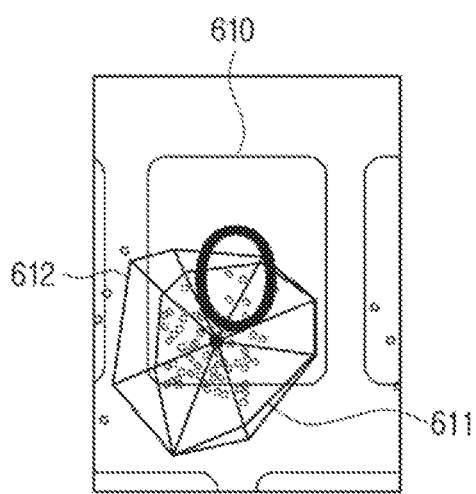
Figure 6D:
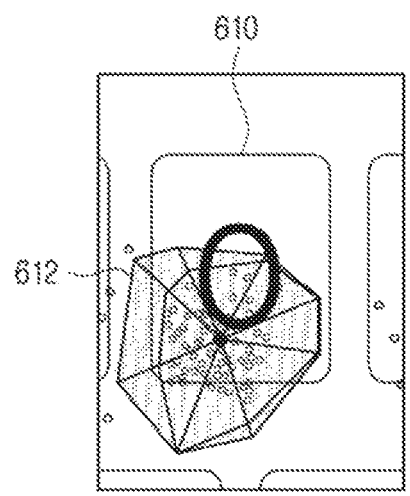

For example, the processor 130 may collect touch points for the letter key "O" as illustrated in FIG. 6A and identify an area 611 covering the touch points as illustrated in FIG. 6B. Thereafter, as illustrated in FIG. 6C, the processor may expand the area 611 identified based on a center point of the identified area 611, and identify the expanded area 612. Thereafter, as illustrated in FIG. 6D, the processor may provide the expanded area 612 to be distinguished from other areas. For example, the processor may expand the size to be distinguished from other key areas, but may differently provide with at least one of different key areas, color, and contrast.

Figure 7:
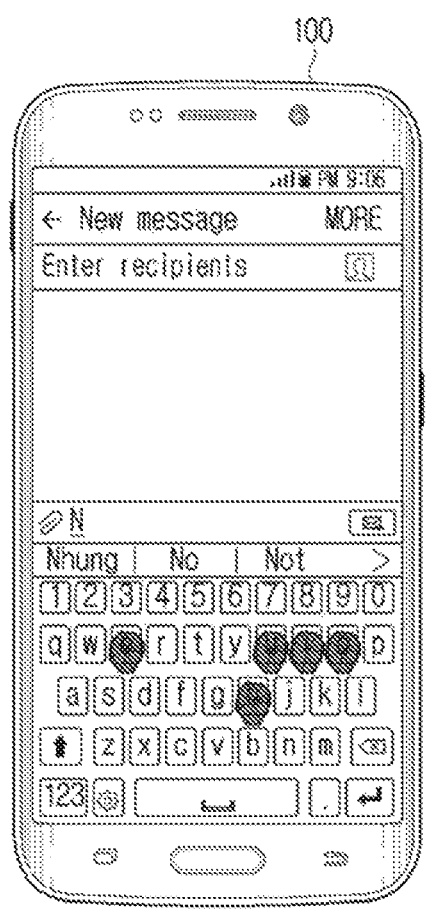

For example, when assuming that a specific letter, for example, "N" 410 is input in the letter input UI 400 provided according to a predetermined event as illustrated in FIG. 4A, illustrated in FIG. 7. As described above, the active area of the key corresponding to the predicted letter may be expanded and provided based on the touch point. In this case, the area expanded based on the touch point may have a polygonal shape, but is not limited thereto.

However, when the electronic device 100 is implemented in the form of providing the letter input UI and receiving a key on the letter input UI by an external pointing device as illustrated in another embodiment of FIG. 1, a pointing position by a pointing device may be collected, and an expanded size of the active area may be determined based on the collected pointing position.

Figure 8:
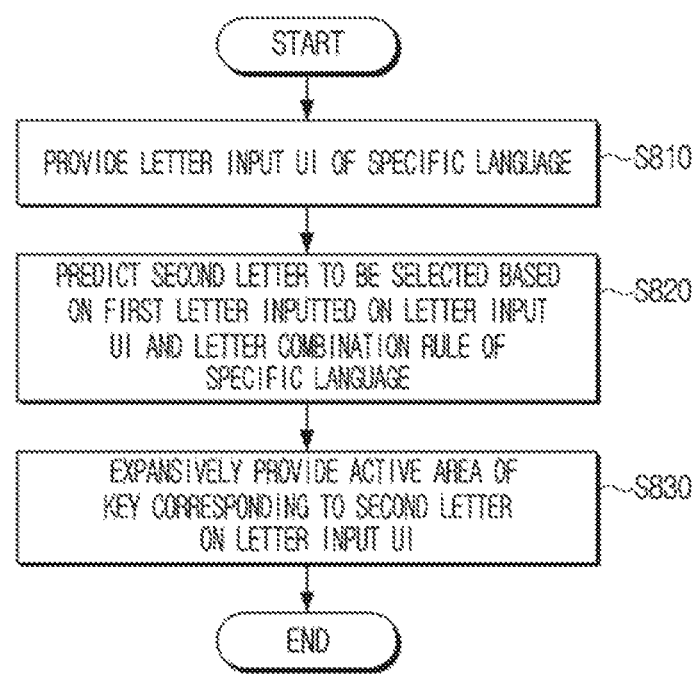
FIG. 8 is a flowchart illustrating a control method of an electronic device, according to an embodiment of the disclosure.

FIG. 8 is a flowchart illustrating a control method of an electronic device, according to an embodiment of the disclosure.

According to the control method of the electronic device illustrated in FIG. 8, a text input UI of a specific language is provided according to a predetermined event (S810).

A second letter to be selected is predicted based on a first letter inputted on the letter input UI and the letter combination rule of the specific language (S820), and an active area of a key corresponding to the second letter is expansively provided on the letter input UI (S830). In this case, the combination rule of the letters constituting a word may be pre-stored for each language.

In operation S830, an active area expanded to a peripheral perimeter area of a key corresponding to the second letter may be provided.

In operation S830, the active area may be displayed in a color different from the remaining keys.

In addition, the control method may further include collecting touch points on the letter input UI based on a user's input history. The operation S830 of expansively providing the active area may expand the active area of the key corresponding to the second letter based on the collected touch points.

In the operation S830, an area covering the collected touch points may be identified, an active area of the key corresponding to the second letter may be determined by expanding the area identified based on a center point of the identified area, and the expanded active area may be displayed.

Meanwhile, the combination rule of letters may be acquired for each language by analyzing a role of letters used together with specific letters from words including specific letters.

Also, the letter combination rule of the specific language may be acquired in at least one of a case in which the letter input UI is loaded and a case in which a specific language is selected by a user.

In operation S830, the second letter having a first priority and the third letter having a second priority are predicted based on the first letter and the letter combination rule of the specific language, and the active area of a key corresponding to the third letter may be expansively provided.

In operation S830, the active areas of the keys corresponding to the second letter and the third letter may be displayed in a color different from the remaining keys.

According to various embodiments of the disclosure, the user may intuitively identify a letter that is most likely to be input next on the letter input UI, thereby improving user convenience.

The methods according to the above-described example embodiments may be realized as software or applications that may be installed in the existing electronic apparatus.

Further, the methods according to the above-described example embodiments may be realized by upgrading the software or hardware of the existing electronic apparatus.

The above-described example embodiments may be executed through an embedded server in the electronic apparatus or through an external server outside the electronic apparatus.

Various exemplary embodiments described above may be embodied in a recording medium that may, be read by a computer or a similar apparatus to the computer by using software, hardware, or a combination thereof, and may also be embodied as a computer program product containing such a recording medium. In some cases, the embodiments described herein may be implemented by the processor itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium. The computer instructions stored in the non-transitory computer-readable medium may cause a particular device to perform processing operations on the device according to the various embodiments described above when executed by the processor of the particular device.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
   a display;
   a storage unit configured to store a combination rule of letters constituting a word; and
   a processor configured to provide a letter input UI of a specific language, configured to receive an input of a first letter via the letter input UI, configured to predict a second letter to be selected based on the first letter that has been inputted and the combination rule of letters of the specific language stored in the storage unit, and configured to control the display such that an active area of a key corresponding to the second letter is expansively provided,
   wherein the processor is configured to collect touch points on the letter input UI based on an key input history of a user, configured to obtain a first expanded area of the active area of the key corresponding to the second letter based on the collected touch points, and configured to control the display such that the first expanded area is superimposed on the active area of the key corresponding to the second letter, the first expanded area being visually distinguishable from the active area of the key corresponding to the second letter,
   wherein the processor is configured to identify a first area covering the collected touch points, to expand the identified first area based on a center point of the identified first area, and determine the expanded first area as the first expanded area to be superimposed on the active area of the key corresponding to the second letter,
   wherein the processor is configured to, based on the first letter and the combination rule of letters of the specific language, predict the second letter having a first priority and a third letter having a second priority, and expansively provide active areas of keys corresponding to the second letter and the third letter,
   wherein the processor is configured to obtain a second expanded area of an active area of the key corresponding to the third letter based on the collected touch points, and configured to control the display such that the second expanded area is superimposed on the active area of the key corresponding to the third letter, the second expanded area being visually distinguishable from the active area of the key corresponding to the third letter,
   wherein the first priority and the second priority are identified firstly based on a number of the combination rule of letters for combining the second letter or the third letter with the first letter, and secondly based on the key input history of the user,
   wherein the processor is further configured to display the first expanded area and the second expanded area in a color different from colors of remaining keys of the letter input UI, and
   wherein the color of the first expanded area and the second expanded area is determined based on the first priority and the second priority.

2. The electronic device as claimed in claim 1, wherein the processor is configured to provide the active area expanded to a peripheral perimeter area of the key corresponding to the second letter.

3. The electronic device as claimed in claim 1, wherein the combination rule of letters is configured to be acquired for each language by analyzing a role of letters used together with a specific letter from letters comprising specific letters.

4. The electronic device as claimed in claim 1, wherein the processor is configured to acquire the combination rule of letters corresponding to the specific language based on at least one of the letter input UI being loaded or the specific language being selected by the user.

5. The electronic device as claimed in claim 1, wherein the processor is configured to display the active areas of the keys corresponding to the second letter and the third letter in a color different from the colors of the remaining keys of the letter input UI.

6. The electronic device as claimed in claim 5, wherein the processor is configured to display the active areas of the keys corresponding to the second letter and the third letter such that at least one of color and lightness is different.

7. A control method of an electronic device configured to store a combination rule of letters constituting a word, the method comprising:
   providing a letter input UI of a specific language and receiving an input of a first letter via the letter input UI;
   predicting a second letter to be selected based on the first letter that has been inputted and the combination rule of letters of the specific language, and controlling a display of the letter input UI such that an active area of a key corresponding to the second letter is expansively provided;
   collecting touch points on the letter input UI based on an key input history of a user, obtaining a first expanded area of the active area of the key corresponding to the second letter based on the collected touch points, and controlling the display such that the first expanded area is superimposed on the active area of the key corresponding to the second letter, the first expanded area being visually distinguishable from the active area of the key corresponding to the second letter;
   identifying a first area covering the collected touch points, expanding the identified first area based on a center point of the identified first area, and determining the expanded first area as the first expanded area to be superimposed on the active area of the key corresponding to the second letter;
   based on the first letter and the combination rule of letters of the specific language, predicting the second letter having a first priority and a third letter having a second priority, expansively providing active areas of keys corresponding to the second letter and the third letter;
   obtaining a second expanded area of an active area of the key corresponding to the third letter based on the collected touch points, and controlling the display such that the second expanded area is superimposed on the active area of the key corresponding to the third letter, the second expanded area being visually distinguishable from the active area of the key corresponding to the third letter; and displaying the first expanded area and the second expanded area in a color different from colors of remaining keys of the letter input UI, wherein the color of the first expanded area and the second expanded area is determined based on the first priority and the second priority, wherein the first priority and the second priority are identified firstly based on a number of the combination rule of letters for combining the second letter or the third letter with the first letter, and secondly based on the key input history of the user.

8. The method as claimed in claim 7, wherein the expansively providing the active area comprises providing the active area expanded to a peripheral perimeter area of the key corresponding to the second letter.

9. The method as claimed in claim 7, wherein the combination rule of letters is configured to be acquired for each language by analyzing a role of letters used together with a specific letter from letters comprising specific letters.

10. The method as claimed in claim 7 further comprising:

acquiring the combination rule of letters corresponding to the specific language based on at least one of the letter input UI being loaded or the specific language being selected by the user.

11. The method as claimed in claim 7, wherein the expansively providing the active area comprises displaying the active areas of the keys corresponding to the second letter and the third letter in a color different from the colors of the remaining keys of the letter input UI.

\* \* \* \* \*